US012651912B2

(12) United States Patent
Ohkoshi et al.

(10) Patent No.: US 12,651,912 B2
(45) Date of Patent: Jun. 9, 2026

(54) SOLAR CHARGING SYSTEM, METHOD, AND VEHICLE

(71) Applicant: TOYOTA JIDOSHA KABUSHIKI KAISHA, Toyota (JP)

(72) Inventors: Kohki Ohkoshi, Nagoya (JP); Yuma Miyamoto, Toyota (JP); Taisuke Hayashi, Miyoshi (JP); Takashi Fukai, Oobu (JP); Akinori Kawamura, Okazaki (JP); Masahiro Takahashi, Toyota (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 812 days.

(21) Appl. No.: 17/804,179

(22) Filed: May 26, 2022

(65) Prior Publication Data

US 2023/0072411 A1 Mar. 9, 2023

(30) Foreign Application Priority Data

Sep. 7, 2021 (JP) ................................ 2021-145668

(51) Int. Cl.
| | |
|---|---|
| *H02J 7/35* | (2006.01) |
| *G05B 15/02* | (2006.01) |
| *H02S 40/38* | (2014.01) |

(52) U.S. Cl.
CPC ................ *H02J 7/35* (2013.01); *G05B 15/02* (2013.01); *H02S 40/38* (2014.12)

(58) Field of Classification Search
CPC . H02J 7/35; H02J 2310/48; H02J 7/00; H02S 50/00; H02S 50/10; H02S 40/38; G01R 31/58; G01R 31/67; G01R 31/088; G01R 31/08; G01R 31/081; G01R 31/083; G01R 31/085; G01R 31/086
See application file for complete search history.

(56) References Cited

U.S. PATENT DOCUMENTS

| | | | |
|---|---|---|---|
| 2013/0113418 A1* | 5/2013 | Ishibashi ................... | H02J 7/35 |
| | | | 323/299 |
| 2013/0114312 A1* | 5/2013 | Reichard ............. | H02M 3/1584 |
| | | | 363/37 |

(Continued)

FOREIGN PATENT DOCUMENTS

JP 2021087291 A 6/2021

OTHER PUBLICATIONS (Mitsubishi Electric, Protective Functions, Published Jun. 18, 2019, pp. 11 to 12 "Option1 Fault"). (Year: 2019).*

*Primary Examiner* — Julian D Huffman
*Assistant Examiner* — John P Ondrasik
(74) *Attorney, Agent, or Firm* — Dickinson Wright, PLLC

(57) ABSTRACT

A solar charging system includes a solar panel, a power conversion unit configured to output electric power generated by the solar panel, a battery configured to be directly charged via the power conversion unit with electric power generated by the solar panel, and one or more processors. The one or more processors are configured to transmit, to the power conversion unit via a communication line, a signal that controls a charge enable or disable status of charging from the solar panel to the battery, and determine whether an abnormality in the communication line is present based on the electric power generated by the solar panel, and a voltage at a middle point between the solar panel and the battery.

3 Claims, 6 Drawing Sheets

(56)　　　　　References Cited

U.S. PATENT DOCUMENTS

| | | | | |
|---|---|---|---|---|
| 2014/0247014 A1 * | 9/2014 | Nishikawa | ................ | H02J 7/35 |
| | | | | 320/126 |
| 2016/0303983 A1 * | 10/2016 | Rotay | ..................... | B60L 53/51 |
| 2017/0267113 A1 * | 9/2017 | Harada | ................. | B60L 3/0084 |
| 2019/0204388 A1 * | 7/2019 | Hamamoto | ....... | H01M 10/4264 |
| 2023/0387482 A1 * | 11/2023 | Park | .................. | H01M 10/4207 |

* cited by examiner

SOLAR CHARGING SYSTEM, METHOD, AND VEHICLE

CROSS-REFERENCE TO RELATED APPLICATION

This application claims priority to Japanese Patent Application No. 2021-145668 filed on Sep. 7, 2021, incorporated herein by reference in its entirety.

BACKGROUND

1. Technical Field

The disclosure relates to a solar charging system, a method, and a vehicle.

2. Description of Related Art

Japanese Unexamined Patent Application Publication No. 2021-087291 (JP 2021-087291 A) describes a solar charging system. The solar charging system includes a solar panel, a solar DC-DC converter provided in correspondence with the solar panel, a high-voltage DC-DC converter that supplies a high-voltage battery with electric power output from the solar DC-DC converter without temporarily storing the electric power in an electrical storage device, and an auxiliary DC-DC converter that supplies an auxiliary battery with electric power output from the solar DC-DC converter without temporarily storing the electric power in the electrical storage device.

SUMMARY

In the solar charging system described in JP 2021-087291 A, an electronic control unit (ECU) that controls the state of charge of the high-voltage battery outputs a charge permission signal to the high-voltage DC-DC converter to enable charging of the high-voltage battery.

In charging the high-voltage battery, when it is determined that charging of the high-voltage battery is impossible in prior check for checking whether a charge permission signal is able to be normally output to the high-voltage DC-DC converter, it is not possible to determine whether charging of the high-voltage battery is impossible because of a decrease in electric power generated by the solar panel due to shortage of solar radiation or because of an inability to output a charge permission signal to the high-voltage DC-DC converter due to a break of a communication line. For this reason, there has been a possibility that a charge disable state of the high-voltage battery caused by a decrease in electric power generated by the solar panel due to shortage of solar radiation is erroneously determined as a break of the communication line.

The disclosure provides a solar charging system, a method, and a vehicle capable of reducing erroneous determination on a charge disable state of a high-voltage battery caused by a decrease in electric power generated by a solar panel due to shortage of solar radiation, as a break of a communication line.

A first aspect of the disclosure provides a solar charging system. The solar charging system includes a solar panel, a power conversion unit configured to output electric power generated by the solar panel, a battery configured to be directly charged via the power conversion unit with electric power generated by the solar panel, and one or more processors. The one or more processors are configured to transmit, to the power conversion unit via a communication line, a signal that controls a charge enable or disable status of charging from the solar panel to the battery, and determine whether an abnormality in the communication line is present based on the electric power generated by the solar panel, and a voltage at a middle point between the solar panel and the battery.

A second aspect of the disclosure provides a vehicle. The vehicle includes a solar charging system. The solar charging system includes a solar panel, a power conversion unit configured to output electric power generated by the solar panel, a battery configured to be directly charged via the power conversion unit with electric power generated by the solar panel, and one or more processors. The one or more processors are configured to transmit, to the power conversion unit via a communication line, a signal that controls a charge enable or disable status of charging from the solar panel to the battery, and determine whether an abnormality in the communication line is present based on the electric power generated by the solar panel, and a voltage at a middle point between the solar panel and the battery.

A third aspect of the disclosure provides a method that is executed by a solar charging system. The solar charging system includes a solar panel, a power conversion unit configured to output electric power generated by the solar panel, a battery configured to be directly charged via the power conversion unit with electric power generated by the solar panel, and one or more processors configured to transmit, to the power conversion unit via a communication line, a signal that controls a charge enable or disable status of charging from the solar panel to the battery. The method includes, after causing the solar charging system in a charge enable state of permitting charging from the solar panel to the battery to last for a first period of time, controlling the solar charging system to a charge disable state of not permitting charging from the solar panel to the battery, and, when a voltage at a middle point between the solar panel and the battery reaches a second threshold or higher before the charge disable state lasts for a second period of time, checking for a break of the communication line.

With the solar charging system, the method, and the vehicle according to the disclosure, whether there is an abnormality in a communication line is determined based on electric power generated by the solar panel, and a voltage at a middle point between the solar panel and the battery. Thus, it is possible to reduce erroneous determination on a charge disable state of a high-voltage battery caused by a decrease in electric power generated by a solar panel due to shortage of solar radiation, as a break of a communication line.

BRIEF DESCRIPTION OF THE DRAWINGS

Features, advantages, and technical and industrial significance of exemplary embodiments of the disclosure will be described below with reference to the accompanying drawings, in which like signs denote like elements, and wherein.

DETAILED DESCRIPTION OF EMBODIMENTS

A solar charging system according to the disclosure, in a configuration in which a high-voltage battery is able to be directly charged from a solar panel, confirms that electric power generated by the solar panel is sufficient and then checks for a break in determining whether there is an abnormality in a communication line that transmits a signal that provides an instruction to permit or prohibit charging of the high-voltage battery. Thus, it is possible to reduce erroneous determination on a charge disable state of the high-voltage battery caused by a decrease in electric power generated by the solar panel due to shortage of solar radiation, as a break of the communication line. Hereinafter, an embodiment of the disclosure will be described in detail with reference to the accompanying drawings.

EMBODIMENT

Configuration

Figure 1:
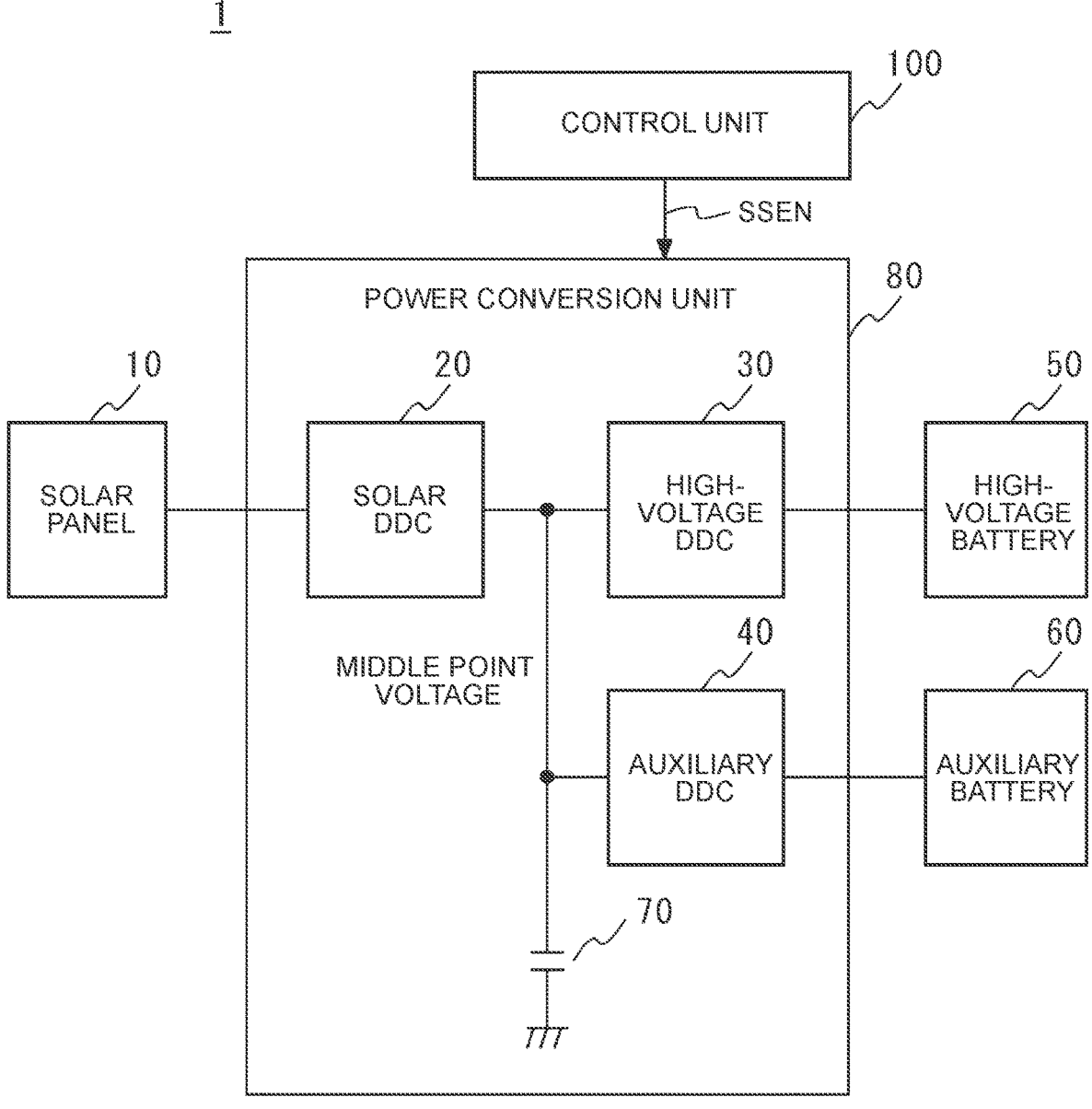
FIG. 1 is a block diagram showing the configuration of a solar charging system according to an embodiment.

FIG. 1 is a block diagram showing the schematic configuration of a solar charging system according to the embodiment of the disclosure. The solar charging system 1 illustrated in FIG. 1 includes a solar panel 10, a solar DDC 20, a high-voltage DDC 30, an auxiliary DDC 40, a high-voltage battery 50, an auxiliary battery 60, a capacitor 70, and a control unit 100. The solar charging system 1 may be mounted on a vehicle or the like.

The solar panel 10 is a power generation apparatus that generates electric power by irradiation with sunlight and is typically a solar cell module that is a collection of solar cells. The solar panel 10 may be installed on, for example, a roof, or the like, of a vehicle. The solar panel 10 is connected to the solar DDC 20 (described later), and electric power generated by the solar panel 10 is output to the solar DDC 20. Electric power generated by the solar panel 10 depends on the amount of solar radiation received by the panel.

The solar DDC 20 is a DC-DC converter (first DC-DC converter) that supplies electric power generated by the solar panel 10 to the high-voltage DDC 30 and the auxiliary DDC 40. When the solar DDC 20 supplies electric power, the solar DDC 20 is capable of converting (stepping up or stepping down) a power generation voltage of the solar panel 10, which is an input voltage, to a predetermined voltage and outputting the voltage to the high-voltage DDC 30 and the auxiliary DDC 40.

The high-voltage DDC 30 is a DC-DC converter (second DC-DC converter) that supplies electric power output from the solar DDC 20 to the high-voltage battery 50. When the high-voltage DDC 30 supplies electric power, the high-voltage DDC 30 is capable of converting (stepping up) an output voltage of the solar DDC 20, which is an input voltage, to a predetermined voltage and outputting the voltage to the high-voltage battery 50.

The auxiliary DDC 40 is a DC-DC converter (third DC-DC converter) that supplies electric power output from the solar DDC 20 to the auxiliary battery 60. When the auxiliary DDC 40 supplies electric power, the auxiliary DDC 40 is capable of converting (stepping down) an output voltage of the solar DDC 20, which is an input voltage, to a predetermined voltage and outputting the voltage to the auxiliary battery 60.

The high-voltage battery 50 is, for example, a rechargeable secondary battery, such as a lithium ion battery and a nickel-metal hydride battery. The high-voltage battery 50 is connected to the high-voltage DDC 30 so as to be chargeable with electric power output from the high-voltage DDC 30. The high-voltage battery 50 mounted on a vehicle may be, for example, a so-called drive battery capable of supplying electric power required for the operation of a main device (not shown) for driving the vehicle, such as a starter motor and an electric motor.

The auxiliary battery 60 is, for example, a rechargeable secondary battery, such as a lithium ion battery and a lead acid battery. The auxiliary battery 60 is connected to the auxiliary DDC 40 so as to be chargeable with electric power output from the auxiliary DDC 40. The auxiliary battery 60 mounted on a vehicle is a battery capable of supplying electric power required for the operations of auxiliary devices (not shown) other than for driving the vehicle, including lamps, such as a head lamp and an interior lamp, air conditioners, such as a heater and a cooler, and devices for autonomous driving and advanced driving assistance.

The capacitor 70 is connected between the solar DDC 20 and both the high-voltage DDC 30 and the auxiliary DDC 40. The capacitor 70 is a large-capacity capacitive element used to, for example, charge and discharge electric power generated at the solar panel 10 as needed or stabilize the voltage at a connection point (hereinafter, referred to as "middle point") at which the output of the solar DDC 20 and the inputs of both the high-voltage DDC 30 and the auxiliary DDC 40 are connected.

The solar DDC 20, the high-voltage DDC 30, the auxiliary DDC 40, and the capacitor 70 make up a power conversion unit 80.

The control unit 100 controls a charging status of charging from the solar panel 10 to the high-voltage battery 50 by transmitting a signal that provides an instruction to permit or prohibit charging of the high-voltage battery 50 (hereinafter, referred to as charge control signal) to the power conversion unit 80 via the communication line SSEN. The control unit 100 is able to acquire a voltage at a middle point at which the solar DDC 20 is connected to both the high-voltage DDC 30 and the auxiliary DDC 40. The middle point voltage is detected by, for example, a voltage sensor provided in the power conversion unit 80, or the like. The control unit 100 of the present embodiment executes control to determine whether there is an abnormality (break) in the communication line SSEN based on the acquired middle point voltage and the electric power generated by the solar panel 10. The details of processes that are executed by the control unit 100 will be described later.

One or some or all of the solar DDC 20, the high-voltage DDC 30, the auxiliary DDC 40, and the control unit 100 can be configured as an electronic control unit (for example, PWC-ECU) that typically includes one or more processors, one or more memories, one or more input/output interfaces, and the like. The electronic control unit is capable of executing the above-described various controls by the processor reading programs stored in the memory and running the programs.

Control

Figure 2A:
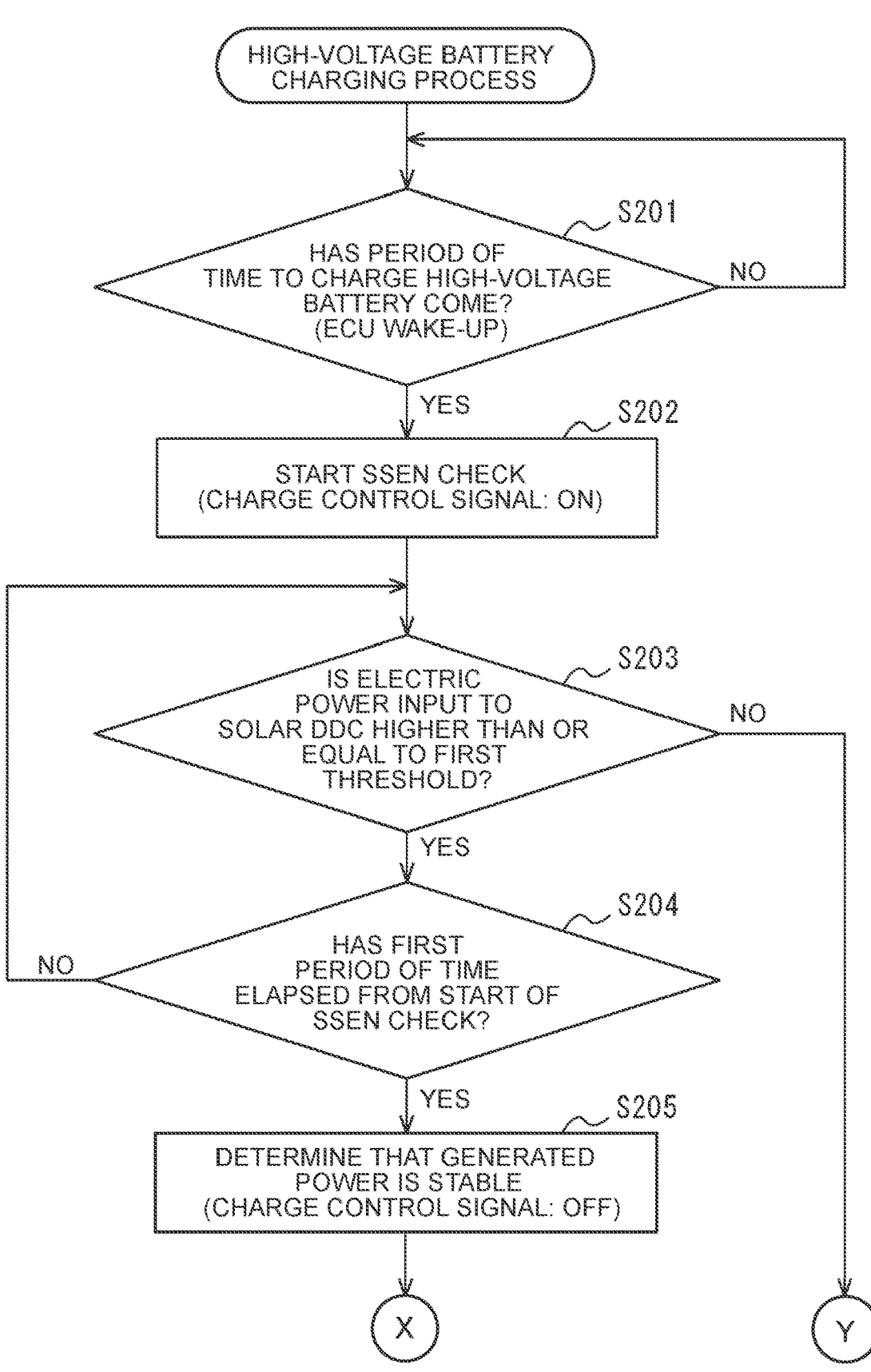
FIG. 2A is a flowchart of a high-voltage battery charging process that is executed by the solar charging system.
Figure 2B:
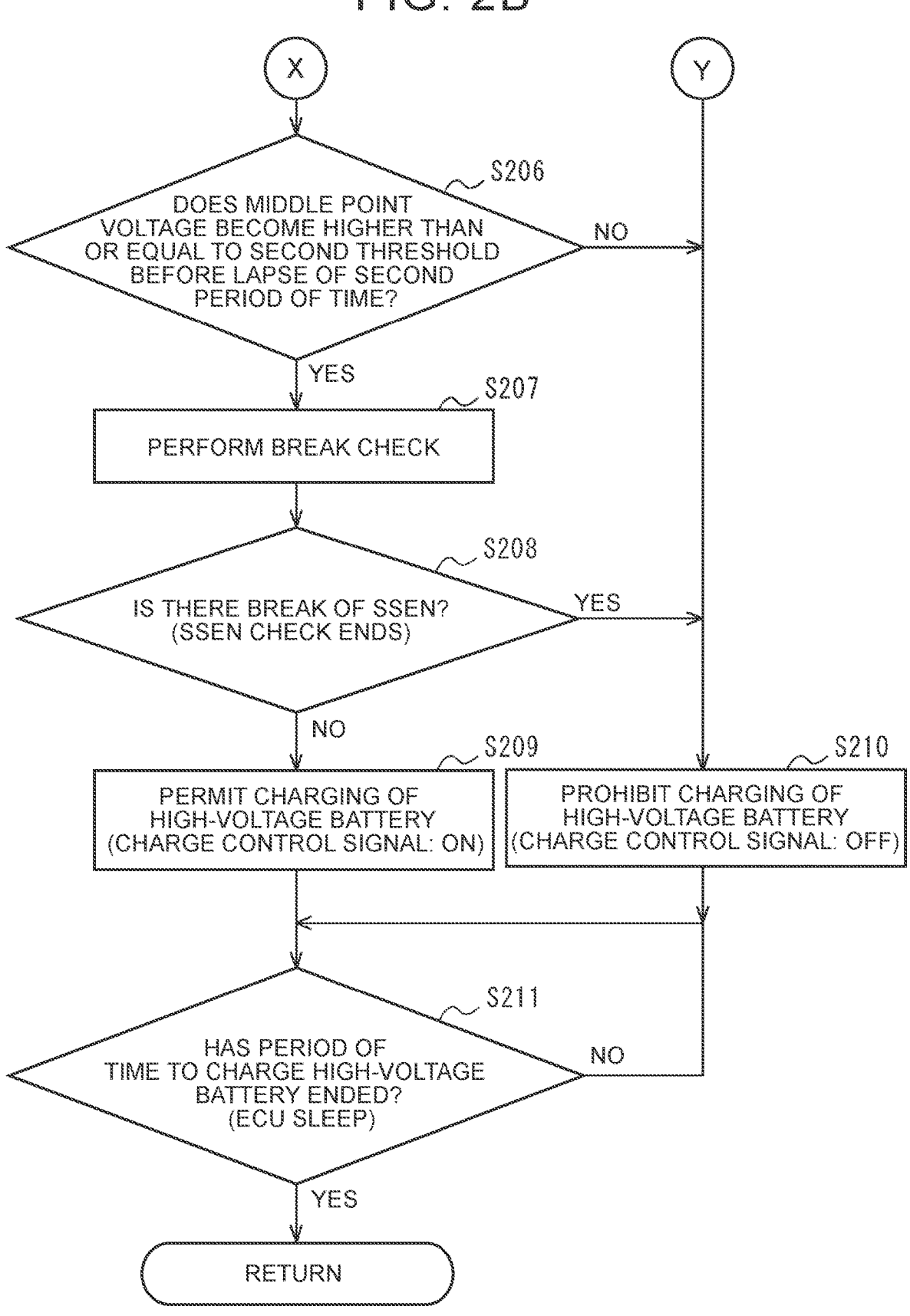
FIG. 2B is a flowchart of the high-voltage battery charging process that is executed by the solar charging system.
Figure 3:
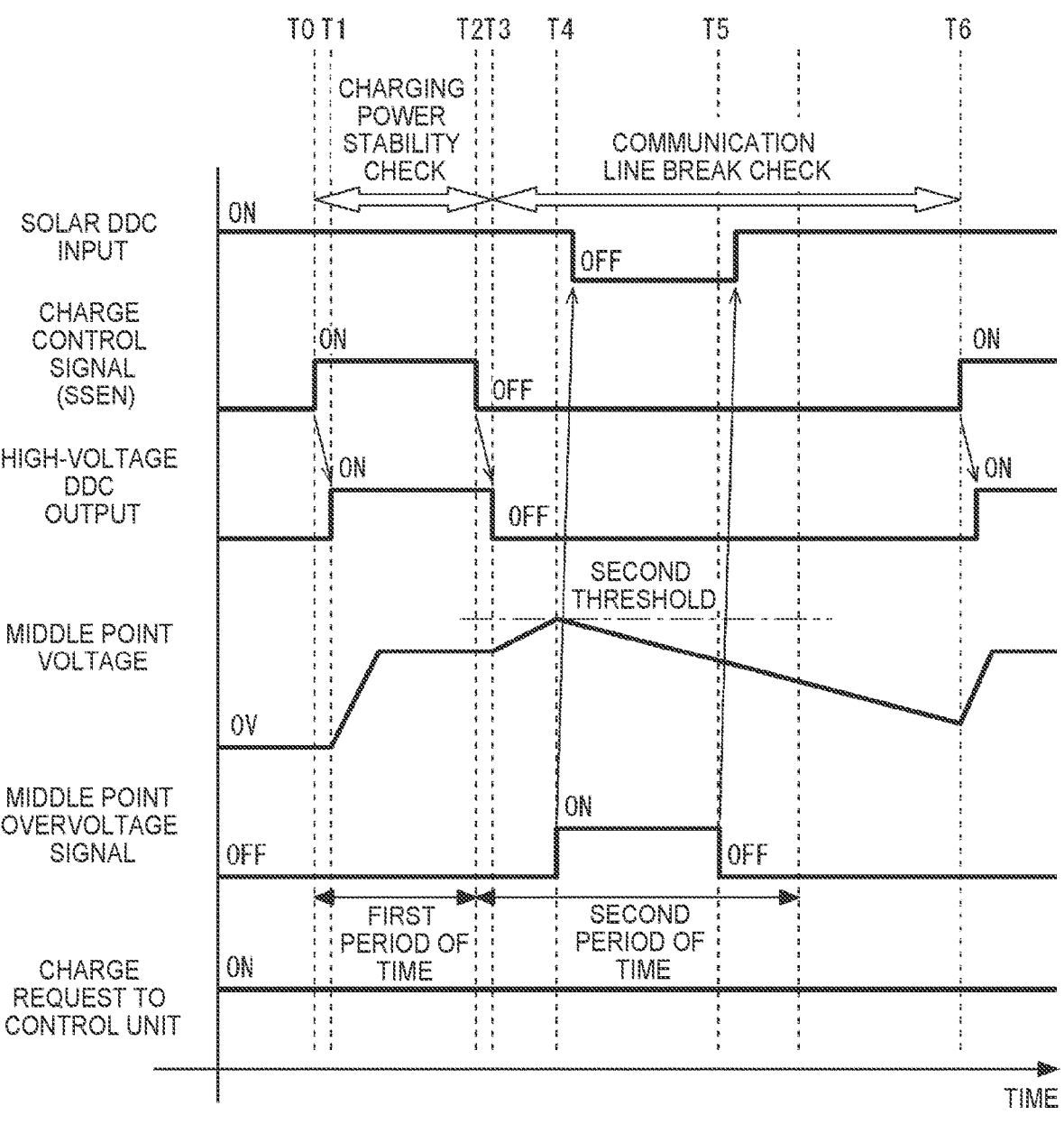
FIG. 3 is a timing chart of the high-voltage battery charging process.
Figure 4:
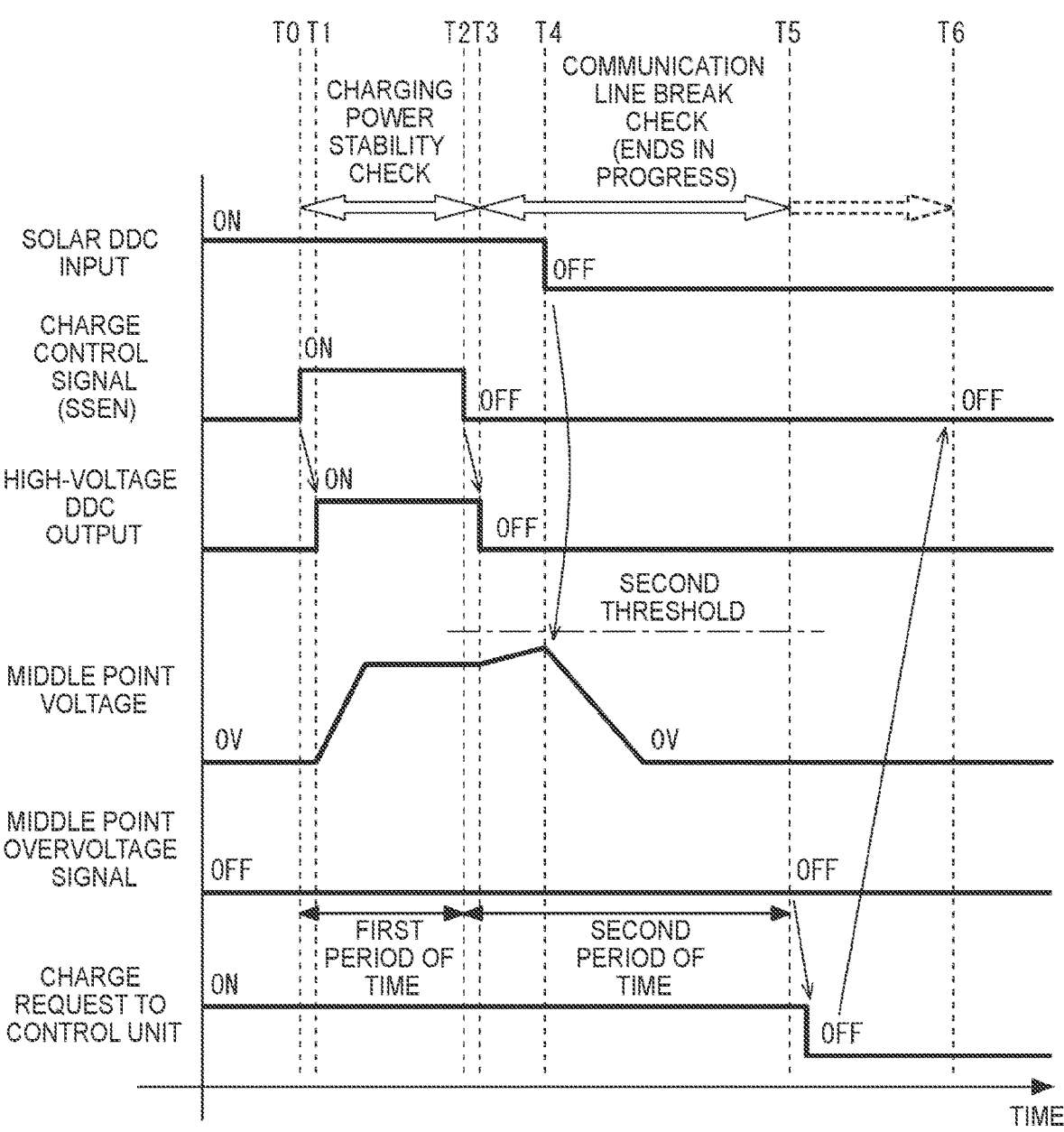
FIG. 4 is another timing chart of the high-voltage battery charging process.
Figure 5:
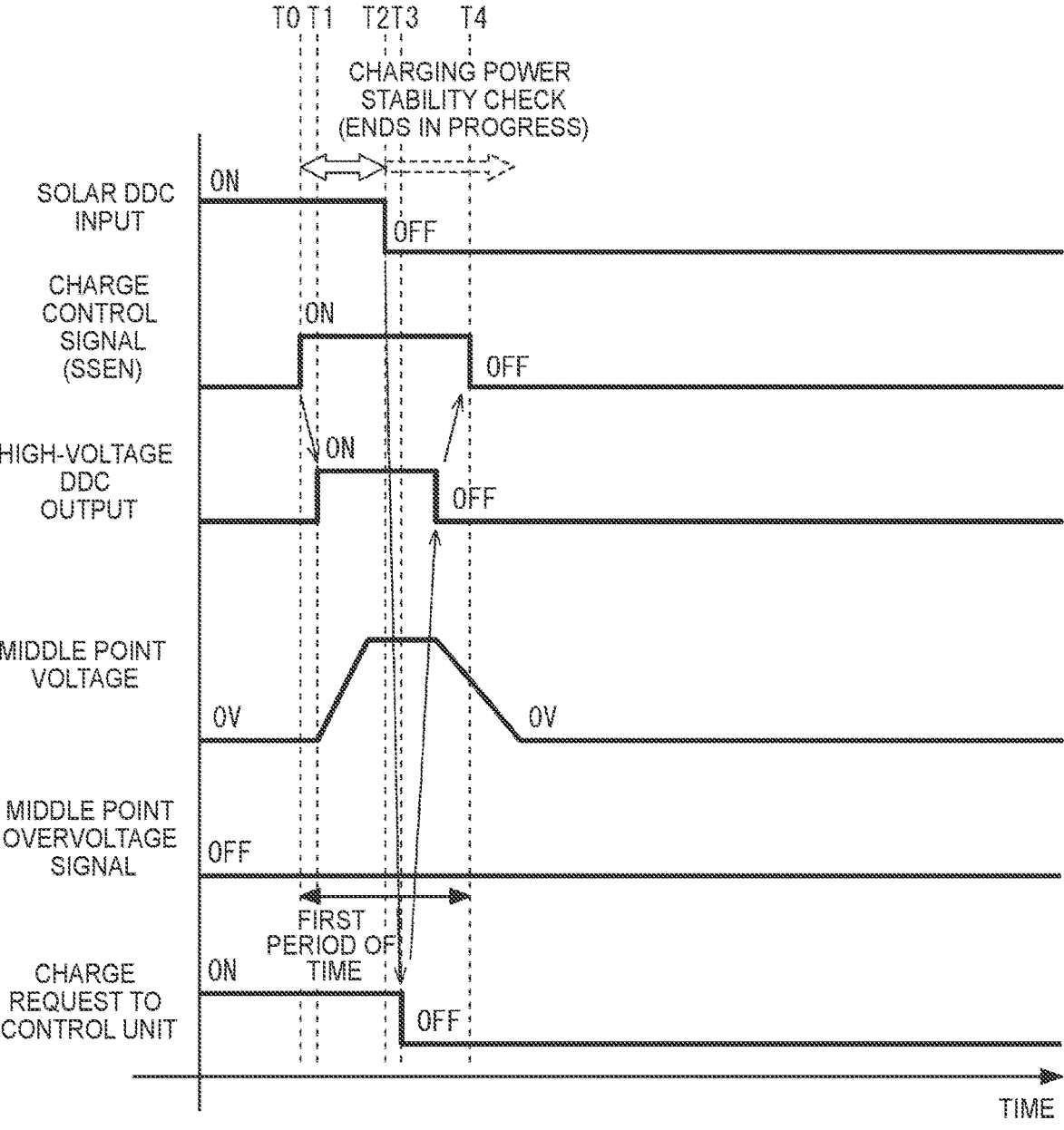
FIG. 5 is further another timing chart of the high-voltage battery charging process.

Next, control that is executed by the solar charging system 1 will be described with further reference to FIG. 2A, FIG. 2B, FIG. 3, FIG. 4, and FIG. 5. FIG. 2A and FIG. 2B are a flowchart illustrating a high-voltage battery charging process that is executed by the control unit 100 of the solar charging system 1. The process of FIG. 2A and the process of FIG. 2B are connected by connectors X and Y. FIG. 3, FIG. 4, and FIG. 5 are examples of a timing chart of the high-voltage battery charging process in different situations.

The high-voltage battery charging process shown in FIG. 2A and FIG. 2B is started when an ignition of the vehicle is turned off (IG-OFF) while the vehicle is parked or stopped, and is, for example, repeatedly executed until the ignition is turned on (IG-ON) next time.

Step S201

The control unit 100 determines whether a period of time to charge the high-voltage battery 50 has come. Generally, after the ignition of the vehicle is turned off, a sleep state in which part of the functions of the power conversion unit 80 are stopped for reducing depletion of each battery and a wake-up state in which all the functions are activated are periodically repeated. Charge control over the high-voltage battery 50 is executed in the wake-up state. Only when a period of time to charge the high-voltage battery 50 has come (YES in step S201), the process proceeds to step S202.

Step S202

The control unit 100 starts SSEN check. In SSEN check, the control unit 100 initially checks for power generation stability and, when there is no problem, subsequently checks for a break of the communication line SSEN. In checking for power generation stability, the control unit 100 transmits, to the power conversion unit 80 via the communication line SSEN, a charge control signal that permits charging from the solar panel 10 to the high-voltage battery 50 (charge control signal "ON"). When the control unit 100 starts SSEN check, the process proceeds to step S203.

Step S203

The control unit 100 determines whether the electric power input to the solar DDC 20 is higher than or equal to a first threshold. This determination is performed in order to determine whether the solar panel 10 is generating electric power by receiving sufficient solar radiation. Thus, the first threshold is able to be set to a selected value based on an electric power used for SSEN check. When the electric power input to the solar DDC 20 is higher than or equal to the first threshold (YES in step S203), the process proceeds to step S204. On the other hand, when the electric power input to the solar DDC 20 is lower than the first threshold (NO in step S203), the process proceeds to step S210.

Step S204

The control unit 100 determines whether a first period of time has elapsed from when SSEN check is started (when the charge control signal is set to ON). This determination is performed in order to determine whether the electric power input to the solar DDC 20 has lasted for the first period of time and is sufficient. The first period of time may be set to a selected period of time (for example, 350 ms) used to determine whether there are fluctuations in the amount of solar radiation received by the solar panel 10. When the first period of time has elapsed from the start of SSEN check (YES in step S204), the process proceeds to step S205. On the other hand, when the first period of time has not elapsed yet from the start of SSEN check (NO in step S204), the process proceeds to step S203.

Step S205

The control unit 100 determines that the electric power generated by the solar panel 10 is stable. Based on this determination, the control unit 100 transmits, to the power conversion unit 80 via the communication line SSEN, the charge control signal that prohibits charging from the solar panel 10 to the high-voltage battery 50 (charge control signal "OFF"). When the control unit 100 determines that the electric power generated by the solar panel 10 is stable, the process proceeds to step S206.

Step S206

The control unit 100 determines whether the middle point voltage becomes higher than or equal to a second threshold before a second period of time elapses from when the charge control signal is set to OFF. When electric power is continuously output from the solar DDC 20 while the high-voltage DDC 30 is not in operation, electric charge is gradually stored in the capacitor 70 and, as a result, the middle point voltage increases (it is assumed that the electric power input to the auxiliary DDC 40 is less than an electric power output from the solar DDC 20). It is presumable that electric power from the solar DDC 20 is continuously output because sufficient solar radiation to the solar panel 10 is continuing. For this reason, when the middle point voltage becomes higher than or equal to the second threshold before the second period of time elapses in a state where the charge control signal is OFF, the control unit 100 is able to determine that the amount of solar radiation to the solar panel 10 is sufficient. The second threshold can be set to a value at which the middle point voltage becomes an overvoltage. The second period of time can be set to a selected period of time (for example, 700 ms) based on, for example, a period of time allocatable to SSEN check. When the middle point voltage becomes higher than or equal to the second threshold before a lapse of the second period of time (YES in step S206), the process proceeds to step S207. On the other hand, when the middle point voltage does not become higher than or equal to the second threshold before a lapse of the second period of time (NO in step S206), the process proceeds to step S210.

Step S207

The control unit 100 checks for a break of the communication line SSEN that transmits a charge control signal. This break check is able to be performed by executing ON/OFF control over the charge control signal and ON/OFF control over the solar DDC 20 and determining the middle point voltage at that time. When the control unit 100 checks for a break of the communication line SSEN, the process proceeds to step S208.

Step S208

The control unit 100 determines whether there is a break of the communication line SSEN that transmits a charge control signal. When the control unit 100 makes the determination, SSEN check ends. When the control unit 100 determines that there is no break of the communication line SSEN (NO in step S208), the process proceeds to step S209. On the other hand, when the control unit 100 determines that there is a break of the communication line SSEN (YES in step S208), the process proceeds to step S210.

Step S209

The control unit 100 permits charging of electric power generated by the solar panel 10 to the high-voltage battery 50. This permission is performed when the control unit 100 transmits, to the power conversion unit 80 via the communication line SSEN, the charge control signal that permits charging from the solar panel 10 to the high-voltage battery 50 (charge control signal "ON"). When the control unit 100 permits charging of the high-voltage battery 50, the process proceeds to step S211.

Step S210

The control unit 100 prohibits charging of the high-voltage battery 50 with electric power generated by the solar panel 10 (interrupts the high-voltage battery 50). This prohibition is performed when the control unit 100 transmits, to the power conversion unit 80 via the communication line SSEN, the charge control signal that prohibits charging from the solar panel 10 to the high-voltage battery 50 (charge control signal "OFF"). When the control unit 100 prohibits charging of the high-voltage battery 50, the process proceeds to step S211.

Step S211

The control unit 100 determines whether the period of time to charge the high-voltage battery 50 has ended. In other words, the control unit 100 determines whether a period of time to set the power conversion unit 80 in the sleep state has come. Only when the period of time to charge the high-voltage battery 50 has ended (YES in step S211), the process returns to step S201.

FIG. 3 is a timing chart of the high-voltage battery charging process in the case where all the SSEN check (charging power stability check and communication line break check) is performed when the amount of solar radiation received by the solar panel 10 is sufficient. Hereinafter, FIG. 3 will be explained.

Time T0: When SSEN check is started, the charge control signal is set to ON. When the charge control signal is set to ON, the output of the high-voltage DDC 30 is set to ON, and the high-voltage DDC 30 is permitted to charge the high-voltage battery 50.

Time T1: When the high-voltage DDC 30 starts outputting electric power, the middle point voltage begins to increase by the electric power input to the solar DDC 20. The middle point voltage increases to a predetermined voltage value in normal charging control.

Time T2: When the first period of time elapses from when the charge control signal is set to ON without a decrease in electric power input to the solar DDC 20 (without being set to OFF), the charge control signal is set to OFF. When the charge control signal is set to OFF, the output of the high-voltage DDC 30 is set to OFF, and the high-voltage DDC 30 is prohibited from charging the high-voltage battery 50.

Time T3: When there is an electric power input to the solar DDC 20 (the electric power input to the solar DDC 20 is set to ON) even when charging of the high-voltage battery 50 is prohibited, the middle point voltage increases beyond the predetermined voltage value.

Time T4: When the middle point voltage increases and reaches an overvoltage (second threshold), a middle point overvoltage signal is set to ON, and the input of the solar DDC 20 is stopped (set to OFF). Thus, the middle point voltage begins to decrease.

Time T5: When the middle point voltage decreases to a predetermined value, the middle point overvoltage signal is set to OFF. Thus, the input of the solar DDC 20 resumes (the input of the solar DDC 20 is set to ON).

Time T6: Since the middle point voltage has reached the overvoltage (second threshold) before the second period of time elapses from when the charge control signal is set to OFF (time T2), the charge control signal is set to ON. Thus, SSEN check ends, the output of the high-voltage DDC 30 is set to ON, and the high-voltage DDC 30 is permitted to charge the high-voltage battery 50. Therefore, control for charging the high-voltage battery 50 from the solar panel 10 is performed.

FIG. 4 is a timing chart of the high-voltage battery charging process in the case where the amount of solar radiation received by the solar panel 10 reduces during SSEN check and SSEN check has been performed up to the middle of communication line break check. Hereinafter, FIG. 4 will be explained.

Time T0: When SSEN check is started, the charge control signal is set to ON. When the charge control signal is set to ON, the output of the high-voltage DDC 30 is set to ON, and the high-voltage DDC 30 is permitted to charge the high-voltage battery 50.

Time T1: When the high-voltage DDC 30 starts outputting electric power, the middle point voltage begins to increase by the electric power input to the solar DDC 20. The middle point voltage increases to a predetermined voltage value in normal charging control.

Time T2: When the first period of time elapses from when the charge control signal is set to ON (T0) without a decrease in electric power input to the solar DDC 20 (without being set to OFF), the charge control signal is set to OFF. When the charge control signal is set to OFF, the output of the high-voltage DDC 30 is set to OFF, and the high-voltage DDC 30 is prohibited from charging the high-voltage battery 50.

Time T3: When there is an electric power input to the solar DDC 20 (the electric power input to the solar DDC 20 is set to ON) even when charging of the high-voltage battery 50 is prohibited, the middle point voltage increases beyond the predetermined voltage value.

Time T4: The input of the solar DDC 20 is stopped (set to OFF) due to shortage of the amount of solar radiation to the solar panel 10. Thus, the middle point voltage begins to decrease without reaching the overvoltage (second threshold).

Time T5: Since the middle point voltage has not reached the overvoltage (second threshold) even when the second period of time has elapsed, the middle point overvoltage signal is set to OFF, with the result that a charge request to the control unit 100 is set to OFF. Thus, communication line break check ends in progress.

Time T6: At the end of the SSEN check period of time, the charge control signal remains OFF because a charge request to the control unit 100 is OFF. Thus, the high-voltage DDC 30 is prohibited from charging the high-voltage battery 50. Therefore, control for charging the high-voltage battery 50 from the solar panel 10 is not performed.

FIG. 5 is a timing chart of the high-voltage battery charging process in the case where the amount of solar radiation received by the solar panel 10 reduces during SSEN check and SSEN check has been performed up to the middle of charging power stability check. Hereinafter, FIG. 5 will be explained.

Time T0: When SSEN check is started, the charge control signal is set to ON. When the charge control signal is set to ON, the high-voltage DDC 30 is permitted to charge the high-voltage battery 50.

Time T1: When the high-voltage DDC 30 starts outputting electric power, the middle point voltage begins to increase by the electric power input to the solar DDC 20. The middle point voltage increases to a predetermined voltage value in normal charging control.

Time T2: The input of the solar DDC 20 is stopped (set to OFF) due to shortage of the amount of solar radiation to the solar panel 10. Thus, a charge request to the control unit 100 is set to OFF.

Time T3: When the charge request to the control unit 100 is OFF, the output of the high-voltage DDC 30 is set to OFF, and the high-voltage DDC 30 is prohibited from charging the high-voltage battery 50.

Time T4: When the output of the high-voltage DDC 30 is set to OFF, the charge control signal is set to OFF. Therefore, control for charging the high-voltage battery 50 from the solar panel 10 is not performed.

Operation and Advantageous Effects

As described above, with the solar charging system 1 according to the embodiment of the disclosure, in a configuration in which the high-voltage battery 50 is able to be directly charged from the solar panel 10, that is, for example, in a configuration in which a temporary storage battery is not connected to the middle point, a power generation state (the amount of solar radiation) of the solar panel 10 is checked and then checking for a break of the communication line SSEN is performed in SSEN check of determining whether there is an abnormality in the communication line SSEN that transmits a charge control signal that provides an instruction to permit or prohibit charging of the high-voltage battery 50.

Thus, checking for a break of the communication line SSEN is able to be performed in a state where the high-voltage battery 50 is charged with a sufficient electric power, so it is possible to reduce erroneous determination on a charge disable state of the high-voltage battery 50 caused by a decrease in electric power generated by the solar panel 10 due to shortage of solar radiation, as a break of the communication line SSEN.

The embodiment of the technology of the disclosure has been described; however, the disclosure is not limited to the solar charging system. The disclosure may also be interpreted as a method that is performed by the solar charging system, a program that implements the method, a non-transitory computer-readable storage medium that stores the program, a vehicle that includes the solar charging system, or the like.

The solar charging system of the disclosure is usable in a vehicle or the like that charges a battery with electric power generated by a solar panel.

What is claimed is:

1. A solar charging system comprising:

a solar panel;

a power conversion unit configured to output electric power generated by the solar panel, wherein the power conversion unit comprises a solar DC-DC converter that receives power output from the solar panel and outputs power to a middle point, and a high voltage DC-DC converter that receives power from the middle point and outputs power to a battery;

wherein the battery is configured to be directly charged via the power conversion unit with electric power generated by the solar panel; and one or more processors configured to transmit, to the power conversion unit via a communication line, a signal that controls a charge enable or disable status of charging from the solar panel to the battery, control the solar charging system to allow charging from the solar panel to the battery when the solar panel's power generation is above a first threshold for a first time period;

when the solar panel's power generation is above the first threshold for the first time period, control the solar charging system to not allow charging from the solar panel to the battery; and when the voltage at the middle point between the solar panel and the battery reaches or exceeds a second threshold before a charging-inhibited state continues for a second time period, determine that a communication line disconnection has not occurred, wherein the second time period is after the first time period.

2. A vehicle comprising a solar charging system that includes:

a solar panel;

a power conversion unit configured to output electric power generated by the solar panel, wherein the power conversion unit comprises a solar DC-DC converter that receives power output from the solar panel and outputs power to a middle point, and a high voltage DC-DC converter that receives power from the middle point and outputs power to a battery;

wherein the battery is configured to be directly charged via the power conversion unit with electric power generated by the solar panel, and one or more processors configured to transmit, to the power conversion unit via a communication line, a signal that controls a charge enable or disable status of charging from the solar panel to the battery, and control the solar charging system to allow charging from the solar panel to the battery when the solar panel's power generation is above the first threshold for the first time period;

when the solar panel's power generation is above the first threshold for the first time period, control the solar charging system to not allow charging from the solar panel to the battery; and when the voltage at the midpoint between the solar panel and the battery reaches or exceeds a second threshold before a charging-inhibited state continues for a second time period, determine that a communication line disconnection has not occurred, wherein the second time period is after the first time period.

3. A method that is executed by a solar charging system that includes a solar panel, a power conversion unit configured to output electric power generated by the solar panel, wherein the power conversion unit comprises a solar DC-DC converter that receives power output from the solar panel and outputs power to a middle point, and a high voltage DC-DC converter that receives power from the middle point and outputs power to a battery, wherein the battery is configured to be directly charged via the power conversion unit with electric power generated by the solar panel, and one or more processors configured to transmit, to the power conversion unit via a communication line, a signal that controls a charge enable or disable status of charging from the solar panel to the battery, the method comprising:

after causing the solar charging system in a charge enable state of permitting charging from the solar panel to the battery to last for a first period of time, controlling the solar charging system to a charge disable state of not permitting charging from the solar panel to the battery; and when a voltage at a middle point between the solar panel and the battery reaches a second threshold or higher before the charge disable state lasts for a second period of time, determine that a communication line break has not occurred, wherein the second time period is after the first time period.

* * * * *